United States Patent Office 3,327,209
Patented June 20, 1967

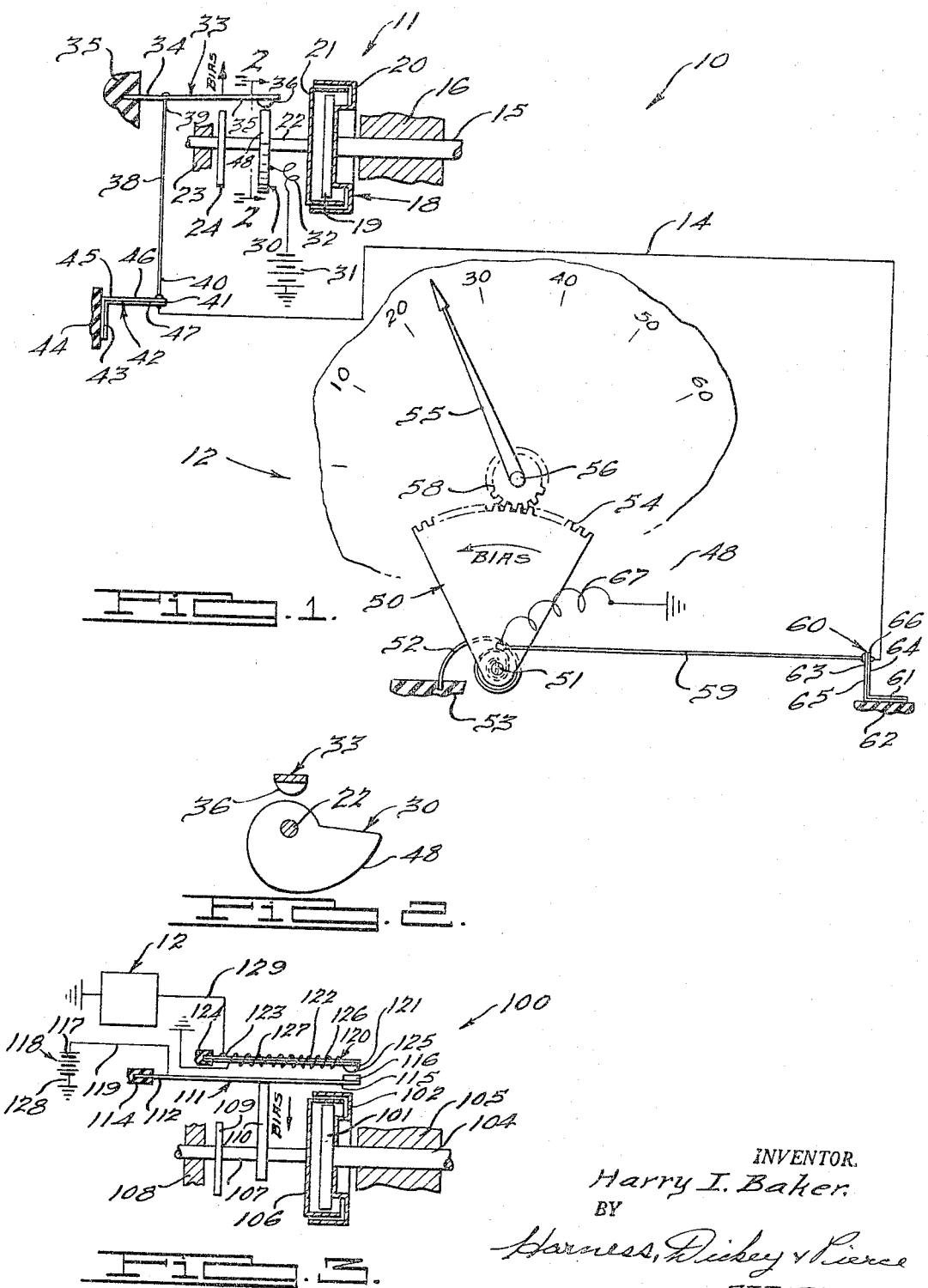

3,327,209
ELECTRIC TACHOMETER SYSTEM EMPLOYING THERMORESPONSIVE ELEMENTS
Harry I. Baker, Ann Arbor, Mich., assignor to King-Seeley Thermos Co., Ann Arbor, Mich., a corporation of Michigan
Filed Nov. 19, 1962, Ser. No. 238,682
4 Claims. (Cl. 324—70)

This invention relates generally to a transducing system, and more particularly to a system for translating rotational velocity into a related mechanical movement.

The novel transducing system of the present invention comprises means for translating the rotational velocity of an input member into an electrical characteristic, and means for integrating and converting the electrical characteristic into a mechanical movement. The translating means has an electrical output characteristic that is integrated by the converting means to give positive indication of the average rotational velocity of the input member over a finite period of time. The output characteristic of the integrator is a visually perceptible mechanical movement.

Accordingly, one object of the present invention is an improved transducing system for converting rotational velocity into a mechanical displacement.

Another object is an improved transducing system that utilizes a flexible electrical conductor between first and second transducers.

Another object is a transducer that is self-regulating.

Another object is a transducer having a thermoresponsive regulator.

Another object is a transducer having a thermoresponsive integrating means.

Other objects and advantages of the present invention will become apparent from a study of the following specification, wherein reference is made to the drawings, in which:

FIGURE 1 is a fragmentary diagrammatic view, partially in section, of an exemplary embodiment of an input transducer and output transducer in operative association.

FIG. 2 is a cross-sectional view taken substantially along the line 2—2 of FIG. 1; and FIG. 3 is a fragmentary diagrammatic view, partially in section, of a modified input transducer.

Referring to the drawings, a transducer system 10 having utility as, for example, an electric speedometer comprises an input transducer or translator 11 and an output transducer or integrator 12 connected to one another by a flexible electrical conductor 14.

The translator 11 comprises a drive shaft 15 which may be directly coupled to, for example, the prime mover or drive train of a motor vehicle (not shown). The shaft 15 is preferably journaled in a suitable bearing 16.

An eddy current drive mechanism 18 as found, for example, in conventional speedometers, comprises a permanent magnet 19 and a field cup 20 that are secured to the shaft 15 for rotation therewith. A speed cup 21 is disposed in close proximity to the permanent magnet 19 and field cup 20 so as to be rotatable upon rotation of the magnet 19 and field cup 20 due to flux linkages therebetween. The speed cup 21 is mounted on a countershaft 22 that is journaled in a suitable bearing 23. A hair spring 24 biases the countershaft 22 and speed cup 21 to a normal or index position.

In accordance with the present invention, a cam 30, having a suitable calibrated slope, as will be discussed, is mounted on the countershaft 22 for rotation therewith. The cam 30 is electrically connected to one side of a source of electrical energy 31 in a manner to permit rotation of the cam 30 yet maintain electrical continuity between the source of electrical energy and the cam 30. This connection is represented, in electrical symbolism, by a conductor 32. The cam 30 functions as one contact of a pair of separable contacts, as will be discussed.

A resilient contact carrier 33, preferably a leaf spring, is rigidly supported at one end 34 as by an insulating member 35. The cantilevered contact carrier 33 supports a contact 36 in complementary aligned relationship with the cam 30 so as to be engageable therewith. The contact carrier 33 has a normal upward bias, as seen in the drawings, so as to normally bias the contact 36 upwardly away from the cam 30.

The contact carrier 33 is restrained from upward flexure by a resistance wire 38 having an upper end portion 39 secured to the contact carrier 33 at a point intermediate the insulating member 35 and the contact 36. A lower end portion 40 of the wire 37 is secured to an outer end portion 41 of an ambient temperature compensating bimetal 42. The wire 38 has a high positive temperature coefficient of expansion and therefore elongates upon heating.

The ambient temperature bimetal 42 is of L-shaped configuration, having a base member 43 that is rigidly secured to an insulating member 44 and a cantilevered portion 45 that extends at a right angle to the base member 43. The bimetal 42 has a high expansion side 46 and a low expansion side 47 that effect clockwise movement of the cantilevered end portion 41 with respect to the base member 43 upon an increase in temperature.

The wire 38, in conjunction with the ambient temperature compensating bimetal 42, positions the contact carrier 33 and contact 36 to an initial position with respect to the cam 30 so that upon the first increment of rotation of the cam 30, an electrical circuit is closed through the source of electrical energy 31, conductor 32, cam 30, contact 36, contact carrier 33, and wire 38 to the integrating device 12, as will be discussed.

As best seen in FIG. 2, the cam 30 has a slope such that the radial distance from a contact surface 48 on the cam 30 to the axis of the shaft 22 varies along a radius drawn through the contact 36 upon rotation of the cam 30. Accordingly, rotation of the cam 30 varies the spacing of the contact surface 48 with respect to the contact 36 for a reason to be discussed.

The current integrating transducer 12 comprises a gear segment 50 mounted for rotation on a suitably journaled shaft 51. The segment 50 and shaft 51 are biased counterclockwise, as seen in the drawing, to an initial position by a hair spring 52 that extends between the shaft 51 and a rigid insulating support 53. The gear segment 50 has a plurality of gear teeth 54 thereon.

A pointer 55 is mounted for rotation on a shaft 56 having a gear 58 thereon in complementary meshing relationship with the teeth 54 on the gear segment 50. Rotation of the segment 50 effects a corresponding rotation, in the reverse direction, of the gear 58 and pointer 55.

The gear segment 50 is restricted from counterclockwise rotation under the bias of the hair spring 52 by a resistance wire 59 having a high positive temperature coefficient of expansion. The wire 59 is secured to the gear segment 50, at a point spaced from the shaft 51 so as to be capable of transmitting a torque to the shaft 51, and to an ambinet temperature compensating bimetal 60.

The ambient temperature compensating bimetal 60 is of L-shaped configuration and has a base leg 61 rigidly secured to an insulating member 62 and a cantilevered end portion 63 extending generally normally to the base leg 61. The bimetal 60 has a low expansion side 64 and a high expansion side 65 that effect a clockwise rotation of an end portion 66 thereof with respect to the base leg 61 upon an increase in ambient temperature.

The wire 59 is connected to the opposite side of the source of electrical energy 31 from the conductor 32 as by a flexible conductor 67, so that, upon closure of the contact 36 against the cam 30, the transducing system 10 is energized.

Upon rotation of the drive shaft 15, due to, for example, movement of a motor vehicle (not shown), the speed cup 21, countershaft 22 and cam 30 are pivoted to a rotational position dependent upon the rotational velocity of the drive shaft 15. As discussed hereinbefore, the cam 30 is suitably calibrated so that the contact face 48 thereof engages the contact 36 upon the first increment of rotation of the cam 30. Current flow through the resistance wire 38 of the translator 11 raises the temperature of the wire 38 causing it to elongate. Elongation of the wire 38 permits the contact carrier 33 to deflect upwardly under its spring bias to separate the contact 36 and cam 30. The circuit through the above system is thus interrupted, permitting the wire 38 to cool. Upon cooling, the wire 38 contracts, thereby biasing the contact carrier 33 and contact 36 downwardly against the cam 30 and reclosing the aforementioned circuit. Thus, the contact 36 and cam 30 are maintained in a state of incipient opening and closing. It is to be noted that the wire 38 consumes just sufficient energy to keep the contact 36 and cam 30 in the aforesaid incipient opening and closing condition, rendering operation of the translating system substantially insensitive to voltage variations and the output current of the translator 11 relatively constant for each rotational position of the cam 30. However, each increment of rotation of the cam 30 sets up a new spatial relationship between the contact 36 and the cam 30, which is reflected by a corresponding variation in the average amount of energy which wire 38 must consume to maintain the aforesaid incipient opening and closing of the contact 36 and cam 30 under the new spatial or physical relationship of those elements. Thus, the faster the speed, the more the energy which is required to permit those elements to separate. This varied energy is reflected by a corresponding variation in the integrated output current from the translator 11.

The integrator 12 functions to integrate the output current of the translator 11 over a finite period of time into a mechanical output characteristic in the form of a rotational increment of the gear segment 50 which is visually reflected by the pointer 55. Current flow from the translator 11 heats the wire 59 which elongates to permit rotation of the gear segment 50 under the bias of the spring 52. Rotation of the gear segment 50 effects a counter rotation of the gear 58 and a corresponding movement of the pointer 55.

Obviously, the wires 38 and 59 vary in length due to changes in ambient temperature. However, flexure of the ambient temperature compensating bimetals 42 and 60, respectively, compensate for such variations by maintaining the effective lengths of the wires 38 and 59 relatively constant with respect to the contact carrier 33 and gear segment 50, respectively.

Referring to FIG. 3, a modified transducer 100 comprises a permanent magnet 101 and a field cup 102 mounted for rotation with a shaft 104. The shaft 104 is journaled in a suitable bearing 105 and is connected, for example, to the prime mover or drive train of a vehicle (not shown). A conventional speed cup 106 is mounted for rotation with respect to the permanent magnet 101 and field cup 102 on a countershaft 107 that is journaled in a bearing 108. A hair spring 109 biases the countershaft 107 and speed cup 106 to a normal or index position.

A cam 110, of electrically insulating material having a slope similar to the slope of the cam 30 described hereinbefore, is mounted on the countershaft 107 for rotation therewith. The cam 110 is so disposed with respect to a resilient cantilevered contact carrier 111, having a normal downward bias, that it restricts downward flexure of the carrier 111 under the said normal bias. The contact carrier 111 has an end portion 112 secured to an insulating support 114 and a free end portion 115 that supports and positions a contact 116. Because the cam 110 has a curve similar to the curve of the cam 30 discussed hereinbefore, rotation of the cam 110 varies the position of the contact carrier 111, and therefore the contact 116. Therefore, the contact 116 is moved upwardly or downwardly in response to the variations in the rotational velocity of the shaft 104.

The contact carrier 111 and contact 116 are electrically connected to one side 117 of a source of electrical energy 118 as by a flexible conductor 119. A bimetallic member 120 having a high expansion side 121 and a low expansion side 122 is supported at one end 123 by a fixed insulating support 124. A contact 125 is supported on a free end 126 of bimetal 120 in complementary aligned relationship with the contact 116 on the contact carrier 111. A heating coil 127 is wound about the bimetal 120 and is electrically connected to the bimetal 120 adjacent the free end 126 thereof and to the other side 128 of the source of electrical energy 118. A flexible electrical conductor 129 connects the fixed end 123 of the bimetallic member 120 to, for example, the current integrating transducer 12.

Upon rotation of the cam 110, due to rotation of the shaft 104 upon, for example, movement of a motor vehicle (not shown), the contact carrier 111 is biased upwardly, thereby closing the contacts 116 and 125. Closure of the contacts 116 and 125 completes an electrical circuit from the source of electrical energy 118 through the conductor 119, contact carrier 111, contact 116, heating coil 127 to the other side of the source of electrical energy 118. Upon an increase of temperature, due to heating of the coil 127, the bimetal 120 flexes upwardly, as seen in the drawings, separating the contact 125 from the contact 116. Upon cooling of the bimetal 120, the contacts 125 and 116 close, due to downward flexure of the bimetal 120. Thus, it is seen that the energy consumption of the heating coil 127 is relatively insensitive to source voltage variations. Therefore, the average output current of the transducer 100 is relatively constant for any given position of the contact 116. However, each increment of rotation of the cam 110 varies the spacing of the contacts 116 and 125, thereby requiring a different energy consumption in the coil 127 to maintain the contacts 125 and 116 in the incipiently opening and closing condition. This varying average current level may be reflected by a visual characteristic from the integrating transducer 12, as discussed hereinbefore.

It is to be noted that, as shown in FIGURE 1, the wires 38 and 59 are of substantially matched thermal characteristics which stabilize the pointer 55. In addition, to preclude spurious fluctuation of the pointer 55 when the transducer 100 of FIG. 3 is employed in conjunction with the integrator 12, it is desirable to match the thermal characteristics of the thermally responsive bimetal 120 with the chemical characteristics of the wire 59 as by employing, for example, a relatively light bimetal 120.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A system for indicating the rotational velocity of a rotating member comprising: an angularly positionable assembly including a first biasing means and a magnetically responsive element initially positioned by said first biasing means; first rotating means coupled to said rotating member and magnetically coupling said rotating member with said magnetically responsive element for angularly positioning said magnetically responsive element as a function of the speed of rotation of said rotating member against the force of said first biasing means; a settable contact, a movable contact; setting means coupled with said magnetically responsive element to vary the relationship between said settable contact and said movable contact in response to variations of the angular positioning of said magnetic responsive element; pulse generating means for producing a series of pulses of electrical energy having an average value over a selected interval of time which varies in accordance with the position of said angularly positionable member and the rotational velocity of the rotating member, said pulse generating means including said contacts, second means biasing one of said contacts in a first direction with respect to the other one of said contacts, and a thermoresponsive means connected to one of said contacts to cause said contacts to move, one with respect to the other, in a direction against the bias of said second resilient member under the control of said pulses; a movable indicator; and an electrical energy responsive integrating means responsive to the average value of said electrical energy pulses averaged over said interval of time for varying the position of said indicator in accordance with said average value including means for biasing said indicator in a first direction, a fixed member, an elongated heat responsive apparatus formed at least in part of material having a relatively high temperature coefficient of expansion, said elongated apparatus being coupled to said fixed member and said indicator and heated in accordance with the average value of said electrical energy pulses for causing said indicator to move in a direction opposite to the force of said biasing means by an amount controlled by said average value of said electrical pulses; and means connecting said integrating means in a circuit with said pulse producing means.

2. The system of claim 1 wherein said thermoresponsive means includes a bimetallic element having self interrupting characteristics.

3. The system of claim 1 wherein said thermoresponsive means includes a hot wire having a positive coefficient of expansion.

4. The system of claim 2 wherein said settable contact is supported by said first biasing means and said setting means includes a cam element for causing greater overclosure of said contacts in response to a greater angular position of said magnetic responsive element, said movable contact being supported on said bimetallic element.

References Cited
UNITED STATES PATENTS

| | | | |
|---|---|---|---|
| 2,520,899 | 8/1950 | Smulski | 324—106 |
| 2,599,258 | 6/1952 | Hoare | 324—106 |
| 2,836,366 | 5/1958 | Eckberg | 324—106 |
| 2,896,163 | 7/1959 | Baker | 324—106 |
| 3,059,180 | 10/1962 | Gentner | 324—70 |
| 3,108,221 | 10/1963 | Peltola | 324—70 |

WALTER L. CARLSON, *Primary Examiner.*

FREDERICK M. STRADER, *Examiner.*

C. W. HOFFMANN, M. J. LYNCH, *Assistant Examiners.*